US009830565B2

(12) United States Patent
O'Toole

(10) Patent No.: US 9,830,565 B2
(45) Date of Patent: Nov. 28, 2017

(54) HYGIENE DEVICE SERVICE NOTIFICATION

(71) Applicant: GOJO Industries, Inc., Akron, OH (US)

(72) Inventor: Martin O'Toole, Chagrin Falls, OH (US)

(73) Assignee: GOJO INDUSTRIES, INC., Akron, OH (US)

( * ) Notice: Subject to any disclaimer, the term of this patent is extended or adjusted under 35 U.S.C. 154(b) by 0 days.

(21) Appl. No.: 14/970,731

(22) Filed: Dec. 16, 2015

(65) Prior Publication Data

US 2016/0180688 A1 Jun. 23, 2016

Related U.S. Application Data

(60) Provisional application No. 62/094,288, filed on Dec. 19, 2014.

(51) Int. Cl.
G06Q 10/06 (2012.01)

(52) U.S. Cl.
CPC .................. G06Q 10/06 (2013.01)

(58) Field of Classification Search
CPC ... G06Q 10/06; G08B 21/245; G09B 19/0076
USPC .................................................. 340/517, 573
See application file for complete search history.

(56) References Cited

U.S. PATENT DOCUMENTS

| 2012/0245729 A1* | 9/2012 | Wegelin | G01F 15/063 700/231 |
| 2014/0081653 A1* | 3/2014 | Davis | G06F 19/327 705/2 |
| 2015/0035678 A1* | 2/2015 | Long | G08B 21/245 340/573.1 |
| 2015/0170502 A1* | 6/2015 | Harris | G08B 21/245 340/573.1 |
| 2015/0315008 A1* | 11/2015 | Locke | B67D 1/1279 222/52 |
| 2015/0366411 A1* | 12/2015 | Yang | A47K 5/1217 222/25 |
| 2016/0005300 A1* | 1/2016 | Laufer | H04W 4/02 340/573.1 |
| 2016/0140831 A1* | 5/2016 | Hermann | G08B 21/24 340/573.1 |

(Continued)

Primary Examiner — Hirdepal Singh
(74) Attorney, Agent, or Firm — Cooper Legal Group, LLC

(57) ABSTRACT

One or more techniques and/or systems are provided for service notification. A notification component may be associated with a hygiene device, such as a material dispenser. The notification component may receive a service notification request (e.g., an infrared signal or other wireless signal) from a maintenance management device (e.g., a computing device associated with a maintenance cart or mobile device of a housekeeper) based upon the maintenance management device being within a communication threshold distance of the hygiene device. The notification component may evaluate a current operational status of the hygiene device to determine a service notification to provide (e.g., a low battery alert, a refill container level indicator, etc.). The service notification may be provided through the hygiene device or through the maintenance management device to the housekeeper (e.g., a blinking light, an audible notification, a textual notification, etc.).

20 Claims, 12 Drawing Sheets

(56) References Cited

U.S. PATENT DOCUMENTS

2016/0180695 A1* 6/2016 Levchenko .......... G08B 21/245
 340/573.1
2016/0380813 A1* 12/2016 Wass ................... H04L 41/0803
 709/220

* cited by examiner

HYGIENE DEVICE SERVICE NOTIFICATION

CROSS-REFERENCE TO RELATED APPLICATIONS

This application claims priority to U.S. Provisional Patent Application No. 62/094,288, filed on Dec. 19, 2014, the entire disclosure of which is hereby incorporated by reference.

TECHNICAL FIELD

The instant application is generally directed towards systems and techniques for service notification. In particular, a notification component, associated with a hygiene device, may provide service notifications based upon the maintenance management device being within a communication threshold distance of the hygiene device. The service notifications describe an operational status of the hygiene device, and providing a service notification may comprise providing the service notification as an alert on the hygiene device (e.g., where the particular alert that is issued depends upon the operational status of the hygiene device) or may be provided to the maintenance management device, which may process the service notification.

BACKGROUND

Many locations, such as hospitals, factories, restaurants, homes, etc., utilize devices for hygiene, such as dispensers to dispense material, touch free faucets for sinks, and/or flush valves for toilets or other bathroom devices. For example, a dispenser may dispense a liquid material, powder material, aerosol material, and/or other materials (e.g., soap, anti-bacterial gels, cleansers, disinfectants, lotions, etc.). Some dispensers utilize a refill container for ease of maintenance, environmental concerns, etc. The refill container may, for example, comprise a pump and/or nozzle mechanism that can be used by a dispenser to dispense material from the refill container. Such hygiene devices may utilize power, such as batteries or an AC adapter, for operation.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for service notification are provided herein. In an example, a notification component, associated with a hygiene device (e.g., a material dispenser, an air freshener, a flush valve, a paper towel dispenser, and/or any other serviceable device), is configured to receive a service notification request from a maintenance management device based upon the maintenance management device being within a communication threshold distance of the hygiene device. For example, the maintenance management device (e.g., a computing device carried by a user such as a housekeeper or attached to a maintenance cart comprising supplies used by the housekeeper) may emit the service notification request, which may be received when the maintenance management device is within communication range of the hygiene device. In some embodiments, the maintenance management device comprises a powered beacon through which the service notification request is emitted and the service notification request is used to energize a passive radio frequency identification device (RFID) component of the notification component.

The notification component may evaluate a current operational status of the hygiene device to determine a service notification. The service notification may be indicative of or comprise information regarding a battery status, a supply status, and/or usage statistics of the hygiene device. The notification component may provide the service notification, such as to the maintenance management device as a signal (e.g., a Bluetooth signal, an infrared signal, a wireless signal, etc.) or to the housekeeper by issuing an alert. In an example, the providing the service notification may comprise issuing an alert based upon the service notification, such as a visual alert, a textual instruction, and/or an audible alert provided through the hygiene device (e.g., a light may blink while the maintenance management device is within communication range of the hygiene device). In another example, the alert may be provided through the maintenance management device (e.g., a textual alert "20% remaining battery" may be displayed through a screen of the maintenance management device; one or more lights on the maintenance management device may blink according to a code that may represent a low battery alert, etc.).

In this way, hygiene devices may alert users, such as housekeepers, in a discrete manner with information relating to servicing such hygiene devices, as opposed to a hygiene device merely providing alerts such as continuously blinking lights or audible alerts that may be annoying or undesirable for the general population to see. Because the notification component may wirelessly communicate with the maintenance management device using low cost wireless communication functionality (e.g., Bluetooth, infrared, radio, etc.), material costs of hygiene devices may be reduced, as compared to hygiene devices that are equipped with sophisticated network technology for communicating over a network. In an example, service notifications may be tailored to provide simplistic notifications to users that may not be tech savvy, and thus would otherwise need training and/or new equipment in order to receive networked service alerts such as through an expensive smart phone. Information may be exchanged between the hygiene device and the maintenance management device (e.g., and between the maintenance management device and computing devices over a network, such as when the maintenance management device is connected to a wireless network hosting device) even though a building comprising the hygiene device may not be network enabled at a location of the hygiene device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
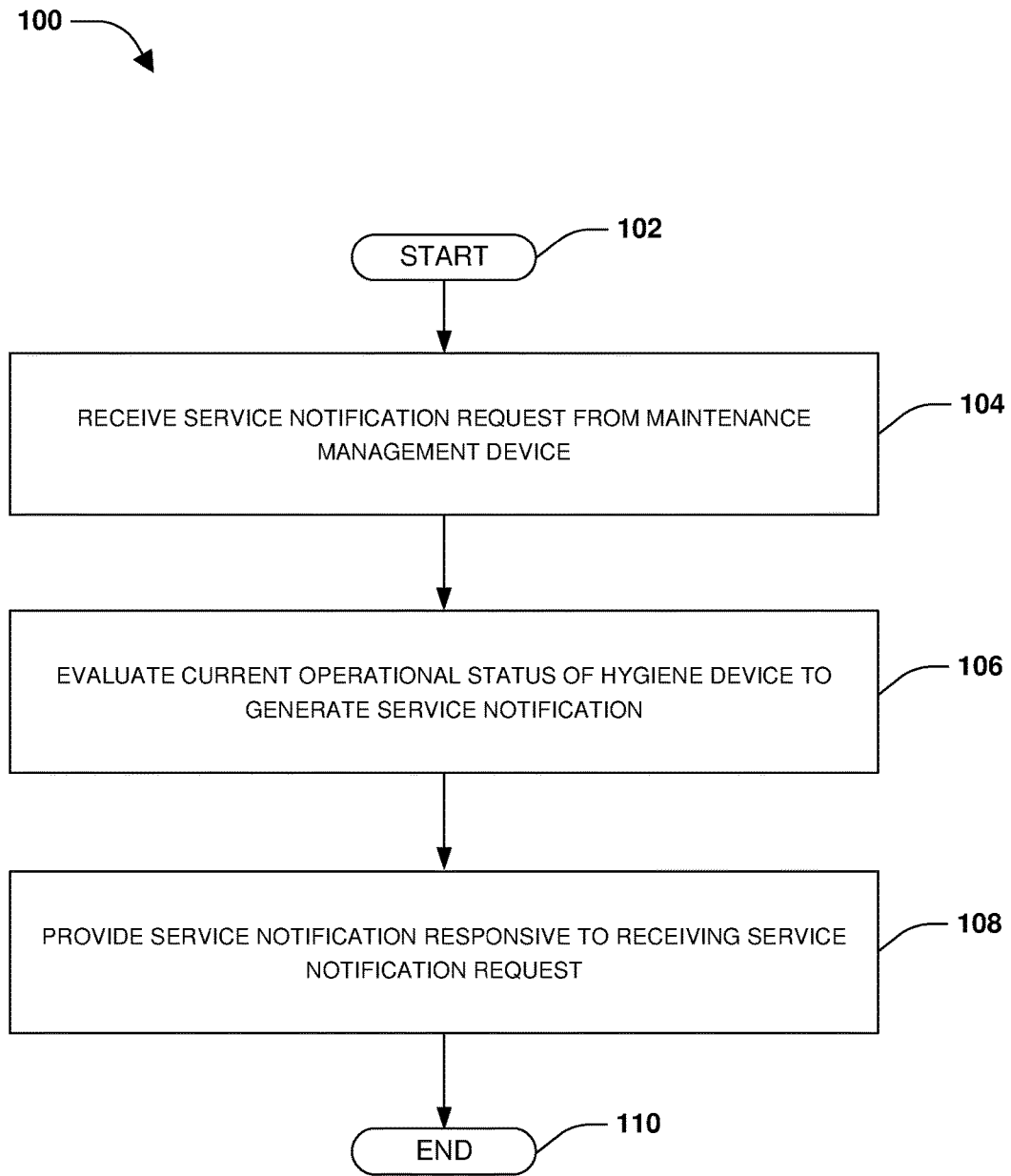
FIG. 1 is a flow diagram illustrating an example method of service notification.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of service notification is illustrated by an exemplary method 100 of FIG. 1. At 102, the method starts. A hygiene device may comprise a material dispenser (e.g., a soap dispenser, a sanitizer, etc.), a paper towel dispenser, a bathroom device (e.g., a faucet), a flush valve (e.g., of a toilet), an air freshener, a bathroom monitor (e.g., a monitor that counts a number of users that enter a bathroom), a serviceable device (e.g., a device comprising a battery or mechanical parts), a supply container, a medicine cabinet, etc. A notification component may be associated with the hygiene device. The notification component may be configured to provide service notifications to maintenance management devices when such maintenance management devices come within communication range of the hygiene device. In an example, the notification component may be configured to transition between power states based upon a spatial proximity of the maintenance management device to the hygiene device. For example, the notification component may enter into a first power state based upon a determination that the maintenance management device is within the communication threshold distance of the hygiene device and may enter into a second power state based upon a determination that a maintenance management device is not within a communication threshold distance of the hygiene device (e.g., because the hygiene does not detect a signal being emitted by the maintenance management device). The first power state may have a greater power load than the second power state, causing the wattage drawn during the first power state to be greater than the wattage drawn during the second power state.

At 104, a service notification request may be received from the maintenance management device based upon the maintenance management device being within the communication threshold distance of the hygiene device. The maintenance management device may be integrated into a maintenance cart associated with a user, such as a housekeeper, or may be integrated into a wearable device, a computing device, or a mobile device associated with the user. In an example, the notification component may transition from the second power state (e.g., a dormant low power state) into the first power state (e.g., an operational state) for evaluating a current operational status of the hygiene device based upon receiving the service notification request. For example, the service notification request may energize a passive RFID component, associated with the notification component, into an energized state for transitioning the notification component into the operational state.

At 106, the current operational status of the hygiene device may be evaluated to generate a service notification. The current operational status of the hygiene device may be evaluated using one or more sensors onboard the hygiene device. For example, a supply sensor may measure an amount of supplies (e.g., fluid, towels, etc.) contained within a supply reservoir (e.g., a fluid reservoir, towel reservoir, etc.) of the hygiene device. As another example, a power sensor may measure an amount of power stored in batteries onboard the hygiene device. The current operational status may also or instead be evaluated based upon usage statistics recorded in memory of the hygiene device by a processing unit of the hygiene device. For example, the number of dispense events since the supply reservoir was last refilled/replaced or since the last maintenance may be recorded as the usage statistics. As still another example, the number of failed dispense events may be recorded as the usage statistics (e.g., instances where the hygiene device attempted to dispense a product by failed due to clogs, jams, etc.).

It may be appreciated that the current operational status of the hygiene device may be continually, periodically, or intermittently evaluated or may be evaluated responsive to receiving a service notification request. That is, the operational status of the hygiene device may be evaluated independently of service notification requests or the evaluation may be dependent upon receiving a service notification request. In some embodiments, such as where the hygiene device periodically or intermittently evaluates the current operational status of the hygiene device, service notifications are generated responsive to the evaluation and may be stored within memory of the hygiene device until a service notification request is received, for example. Thus, while the hygiene device may determine that service is desired in advance of receiving the notification request, in some embodiment the hygiene device may not communicate that determination until the service notification request is received and the service notification is provided. In the interim, before the service notification request is received, the hygiene device may merely store the service notification internally within memory, for example.

At 108, the service notification may be provided responsive to receiving the service notification request. The service notification notifies a user of the operation status of the hygiene device (e.g., when the current operational status was last evaluated at 106). Where the current operational status of the hygiene device is continually evaluated and/or evaluated responsive to receiving the service request, the service notification may describe a real-time state of the hygiene device. In other embodiments, where the current operational status of the hygiene device is evaluated periodically or intermittently, the service notification may describe a state of the hygiene device at a time that the current operational status of the hygiene device was evaluated (e.g., which may be minutes, hours, or days before the service notification request was received at 104).

The service notification may comprise information regarding a battery status of batteries disposed within the hygiene device, supply status (e.g., indicating an amount of fluid, paper towels, etc. contained within a supply reservoir and dispensed via the hygiene device), hygiene device usage statistics (e.g., a number of dispense events since installation of a refill reservoir or since the supply reservoir was last refilled), room usage statistics (e.g., a number of users that entered a room where the hygiene device is located), or other information that impacts the operation of the hygiene device (e.g., clogged nozzle, paper jam, etc.). In some embodiments, a service notification may be provided even if the current operational status indicates that no maintenance is desired (e.g., required). In this way, a user may be notified that the hygiene device received the service notification request but does not require maintenance given its current operational status.

In an example, the service notification may be sent within a signal (e.g., a Bluetooth signal, an infrared signal, or any other wireless communication protocol signal) to the maintenance management device. In an example, the maintenance management device may issue a visual alert (e.g., one or more lights, of the maintenance management device, may be blinked according to a code that may indicate to the user what service may need to be performed for the hygiene device such as ordering a new refill container for the hygiene device), a textual instruction (e.g., a screen of the maintenance management device may display instructions regarding servicing the hygiene device), and/or an audible alert (e.g., a speaker, of the maintenance management device, may provide instructions regarding servicing the hygiene device) responsive to the service notification. The particular alert that is given may be based upon the service notification. For example, a first alert may be issued responsive to the service notification indicating that no maintenance is desired (e.g., the hygiene device is operating as intended), a second alert may be issued responsive to the service notification indicating that batteries disposed within the hygiene device are running low, a third alert may be issued responsive to the service notification indicating that a supply of fluid, towels, etc., within a supply reservoir is below a defined threshold.

In an example, providing the service notification comprises issuing an alert based upon the service notification, such as while the maintenance management device is within the communication threshold distance of the hygiene device (e.g., the hygiene device may blink a light while the housekeeper is near to the hygiene device and may stop blinking when the housekeeper leaves so that the general public does not notice the service notification). Again, the particular alert that is given may be based upon the service notification.

In some embodiments, other information may be exchanged between the hygiene device and the maintenance management device while the devices are within the communication threshold distance. For example, the notification component may provide an identifier of a refill container (e.g., a soap dispenser hygiene device may comprise a soap refill container comprising a unique ID such as a serial model) to the maintenance management device. An instruction, regarding the refill container, may be received from the maintenance management device. The instruction may specify a refill container type (e.g., a type of soap and a size of the refill container), a refill container expiration date, a total number of material dispense events of the refill container (e.g., 150 soap dispense events), and/or other information associated with the refill container. In an example, the instruction may specify a trigger for the dispenser notification component to create a refill container service notification. The instruction may specify that the refill container service notification is to be created once a threshold number of material dispense events occur (e.g., and thus the trigger corresponds to the threshold number of material dispense events). In another example, the maintenance management device may issue a software or firmware update to apply to the hygiene device (e.g., an update as to how much and how long to dispense material, a new type of operational status information to evaluate, a new type of alert to provide based upon a service notification, etc.).

The service notification may be communicated to other computing devices by the maintenance management device. For example, the maintenance cart may be returned to a utility room that comprises network functionality (e.g., WiFi connectivity). The maintenance management device may connect to a network utilizing the network functionality. The maintenance management device may upload the service notification over the network to a computing device, such as a maintenance server. At 110, the method ends.

Figure 2A:
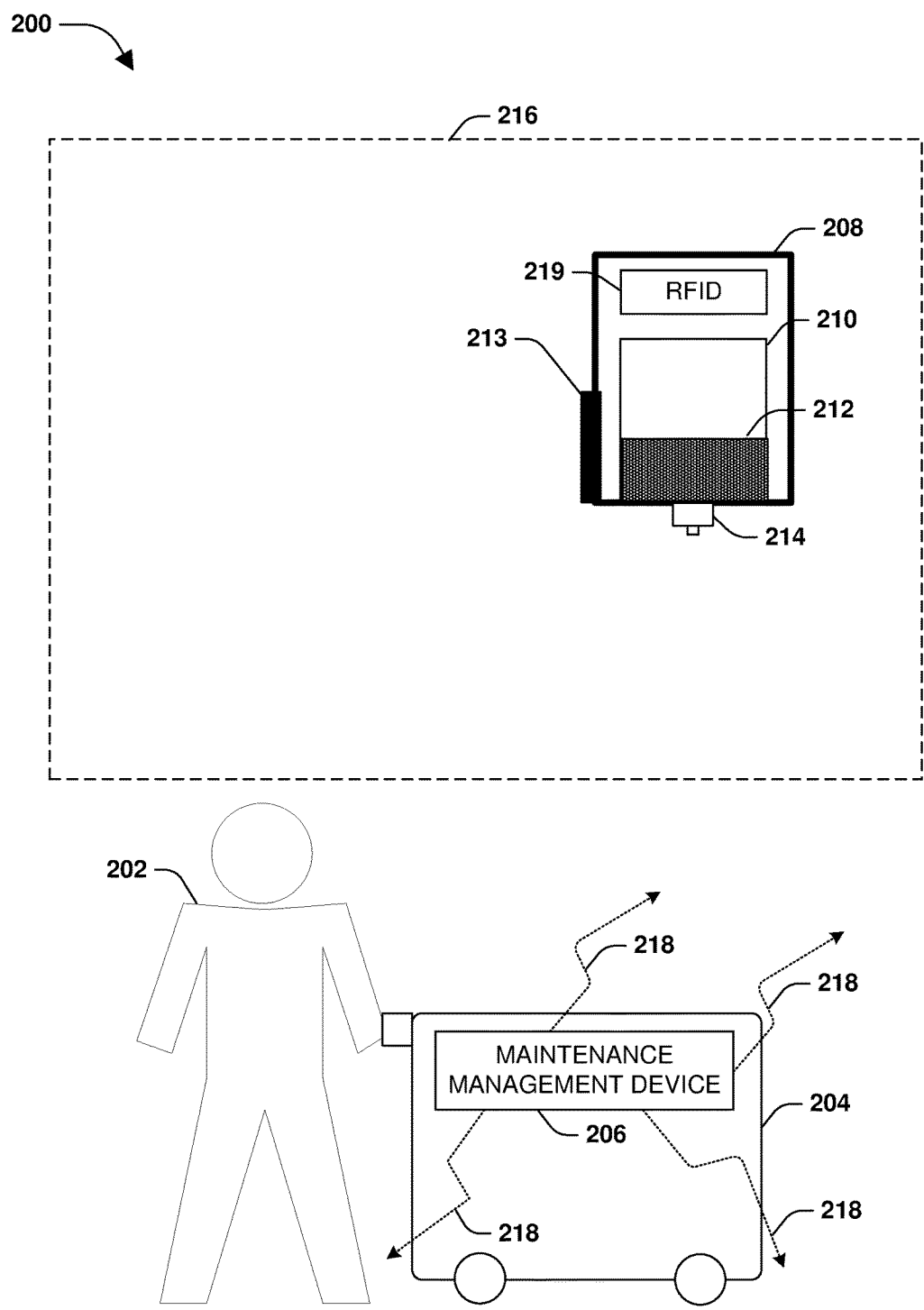
FIG. 2A is a component block diagram illustrating an example system for service notification, where a maintenance management device is outside a communication threshold distance of a hygiene device.
Figure 2B:
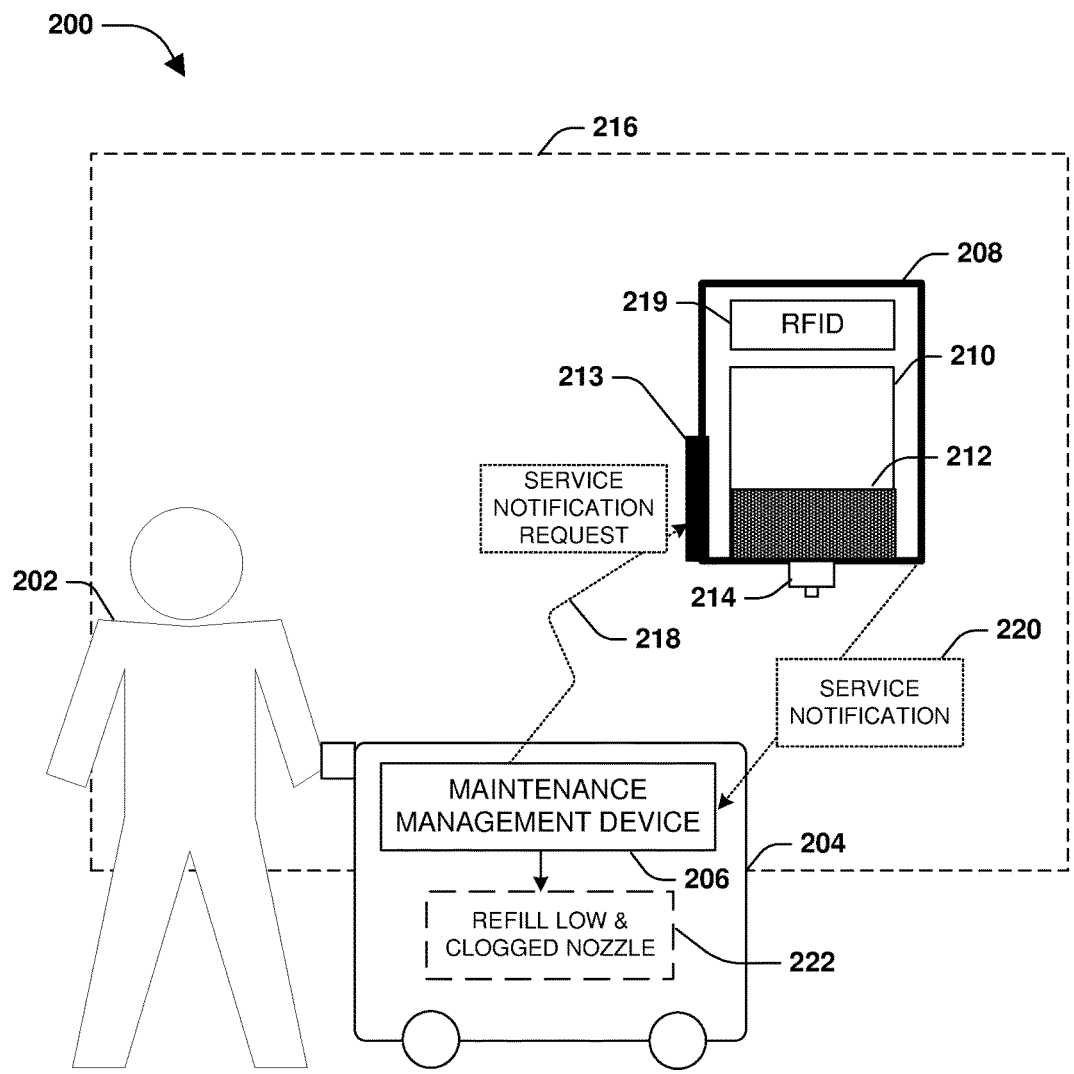
FIG. 2B is a component block diagram illustrating an example system for service notification, where a maintenance management device receives a service notification.

FIGS. 2A-2B illustrate examples of a system 200 for service notification. FIG. 2A illustrates the system 200 comprising a notification component 213 and/or a maintenance management device 206. The notification component 213 may be associated with a material dispenser 208 configured to dispense material 212 of a refill container 210 through a dispenser nozzle 214. The notification component 213 may be associated with a passive RFID component 219 configured to energize into an energized state responsive to receiving a signal from the maintenance management device. In an example, the notification component 213 may be in a dormant low powered state for energy conservation (e.g., a lower powered state than when the material dispenser 208 and/or the notification component 213 are operational).

The maintenance management device 206 may be integrated into a maintenance cart 204 of a housekeeper 202. The maintenance management device 206 may be configured to emit service notification requests 218 (e.g., infrared signals). Because the maintenance management device 206 is not within a communication threshold distance 216 of the material dispenser 208, the notification component 213 may remain in the dormant low powered state.

FIG. 2B illustrates the maintenance management device 206 coming within the communication threshold distance 216 of the material dispenser 208. Accordingly, the notification component 213 may receive the service notification request 218 from the maintenance management device 206. For example, the service notification request 218 may comprise a signal that energizes the passive RFID component 219 so that the RFID component 219 can transition the notification component 213 from the dormant low powered state into an operational state (e.g., a higher powered state than the dormant low powered state). The notification component 213 may evaluate a current operational status of the material dispenser 208 to determine a service notification 220. For example, the service notification 220 may indicate that the refill container 210 is low on material 212 and that the dispenser nozzle 214 is clogged. The maintenance management device 206 may display a textual alert 222 based upon the service notification 220 to the housekeeper 202 (e.g., the textual alert 222 may be displayed through a screen of the maintenance management device 206).

Figure 3A:
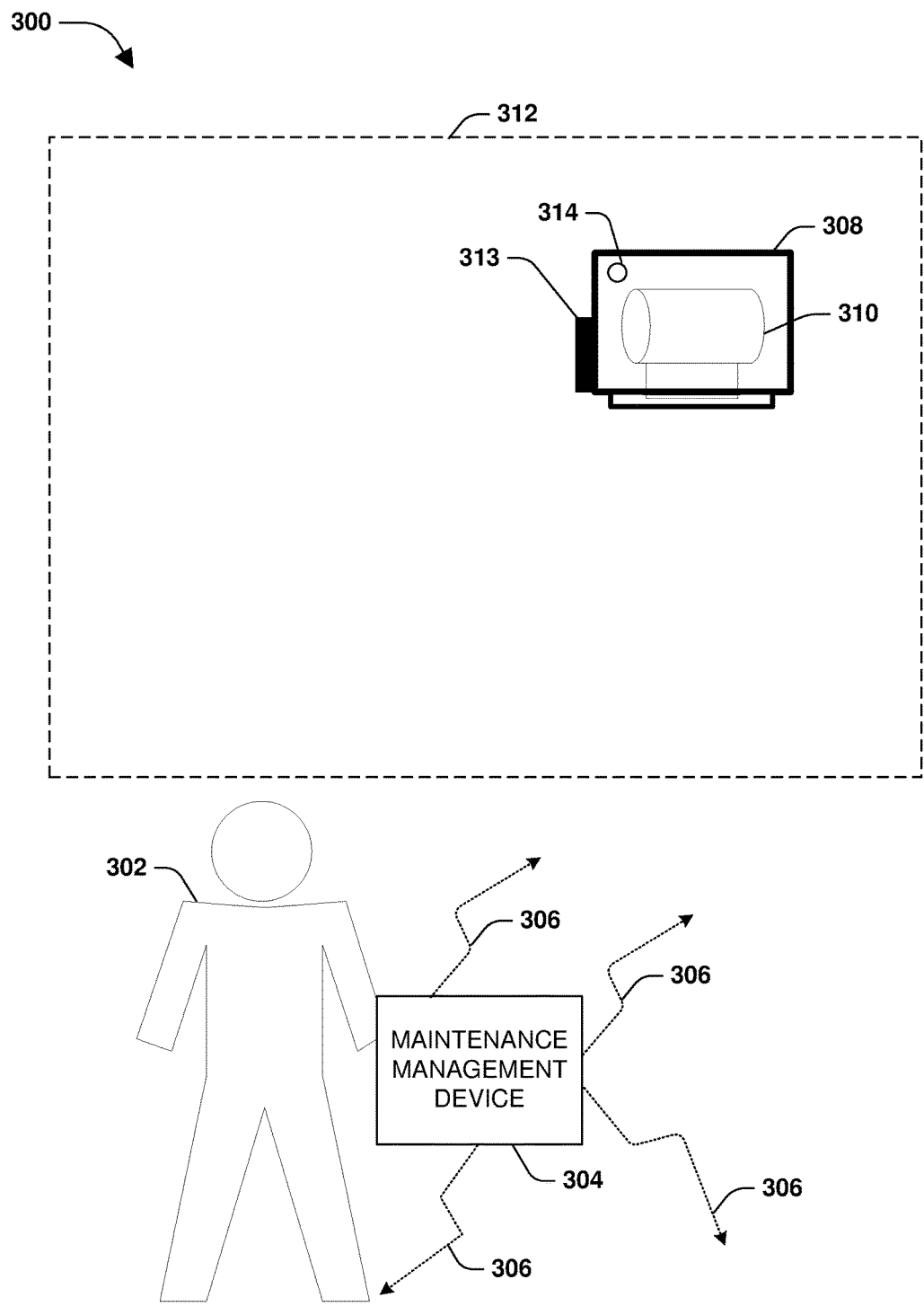
FIG. 3A is a component block diagram illustrating an example system for service notification, where a maintenance management device is outside a communication threshold distance of a hygiene device.
Figure 3B:
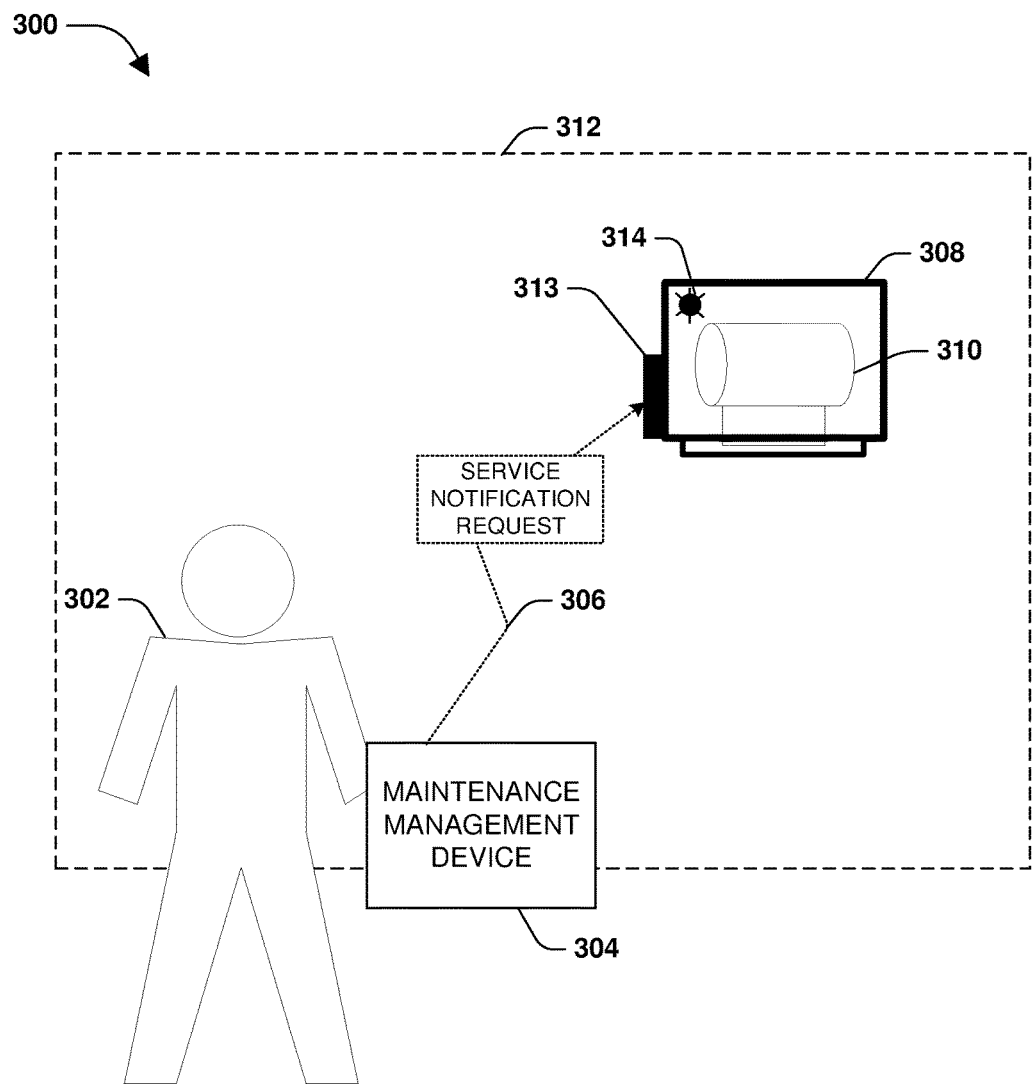
FIG. 3B is a component block diagram illustrating an example system for service notification, where a notification device provides a service notification.
Figure 3C:
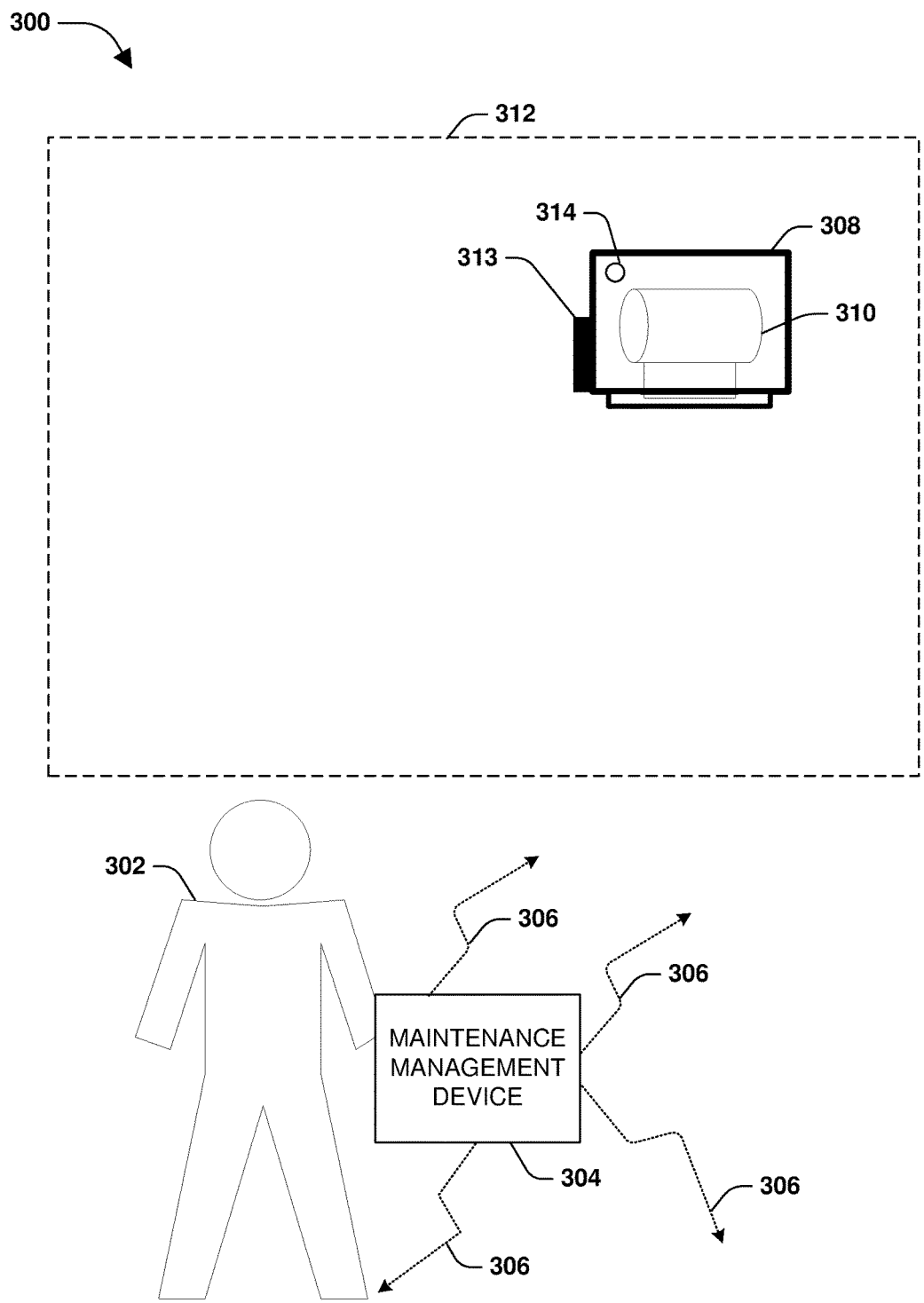
FIG. 3C is a component block diagram illustrating an example system for service notification, where a maintenance management device is outside a communication threshold distance of a hygiene device.

FIGS. 3A-3C illustrate examples of a system 300 for service notification. FIG. 3A illustrates the system 300 comprising a notification component 313 and/or a maintenance management device 304. The notification component 313 may be associated with a paper towel dispenser 308 configured to dispense paper towels of a paper towel refill container 310. The maintenance management device 304 may be integrated into a device, such as a wearable device, a computing device, or a mobile device associated with a housekeeper 302. The maintenance management device 304 may be configured to emit service notification requests 306 (e.g., infrared signals). Because the maintenance management device 304 is not within a communication threshold distance 312 of the paper towel dispenser 308, the notification component 313 may be in the dormant low powered state (e.g., a lower powered state than when the paper towel dispenser 308 and/or the notification component 313 are operational).

FIG. 3B illustrates the maintenance management device 304 coming within the communication threshold distance 312 of the paper towel dispenser 308. Accordingly, the notification component 313 may receive the service notification request 306 from the maintenance management device 304 (e.g., the notification component 313 may transition from the dormant low powered state into an operational state). The notification component 313 may evaluate a current operational status of the paper towel dispenser 308 to determine a service notification. For example, the service notification may indicate that the paper towel dispenser 308 has a low battery. Accordingly, the notification component 313 may provide a visual alert of the low battery, such as by blinking a light 314 of the paper towel dispenser 308, based upon the service notification. FIG. 3C illustrates the notification component 313 stopping the visual alert, such as by stopping the blinking light 314, based upon the maintenance management device 304 being outside the communication threshold distance 312.

Figure 4A:
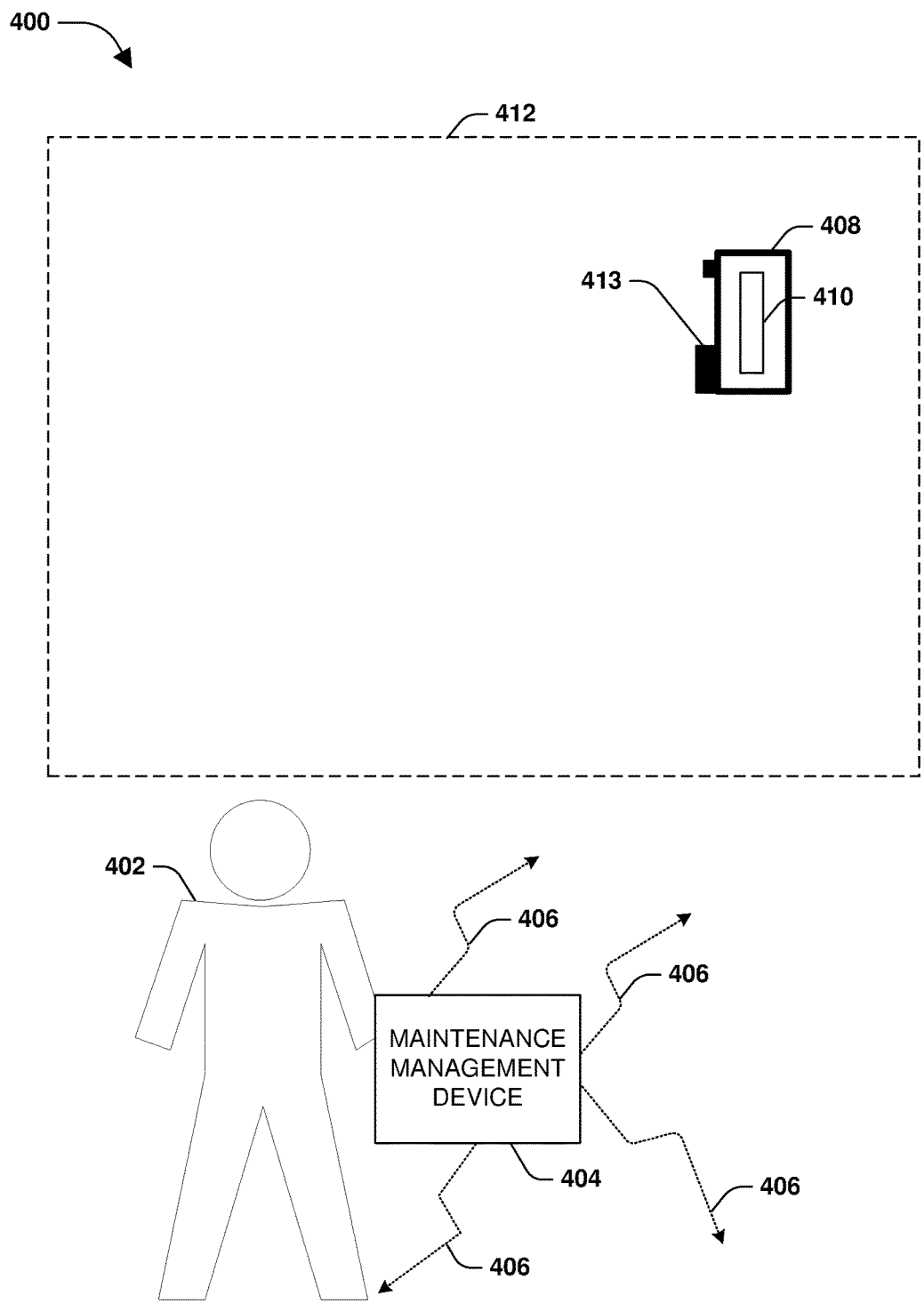
FIG. 4A is a component block diagram illustrating an example system for service notification, where a maintenance management device is outside a communication threshold distance of a hygiene device.
Figure 4B:
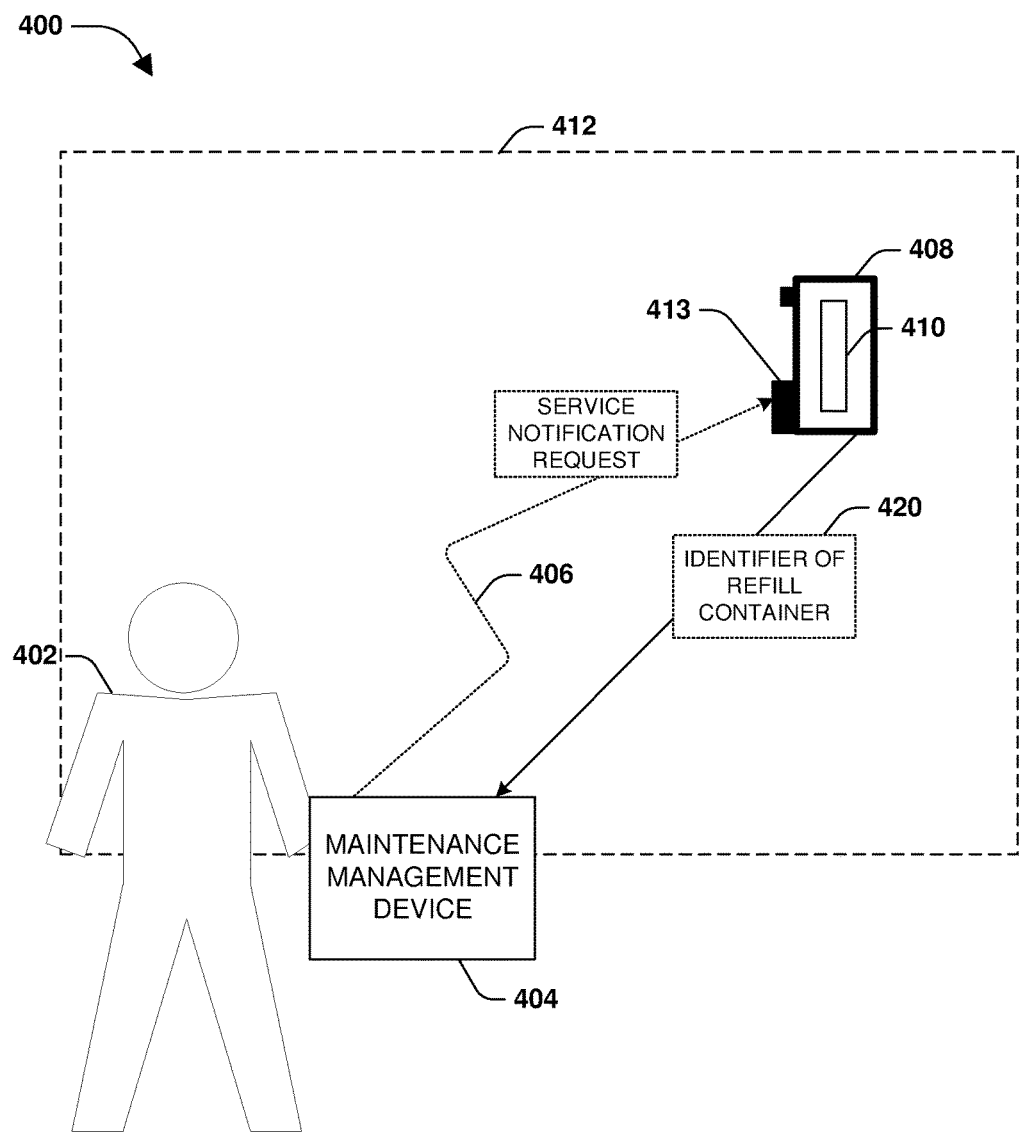
FIG. 4B is a component block diagram illustrating an example system for service notification, where a maintenance management device receives a service notification comprising an identifier of a refill container.
Figure 4C:
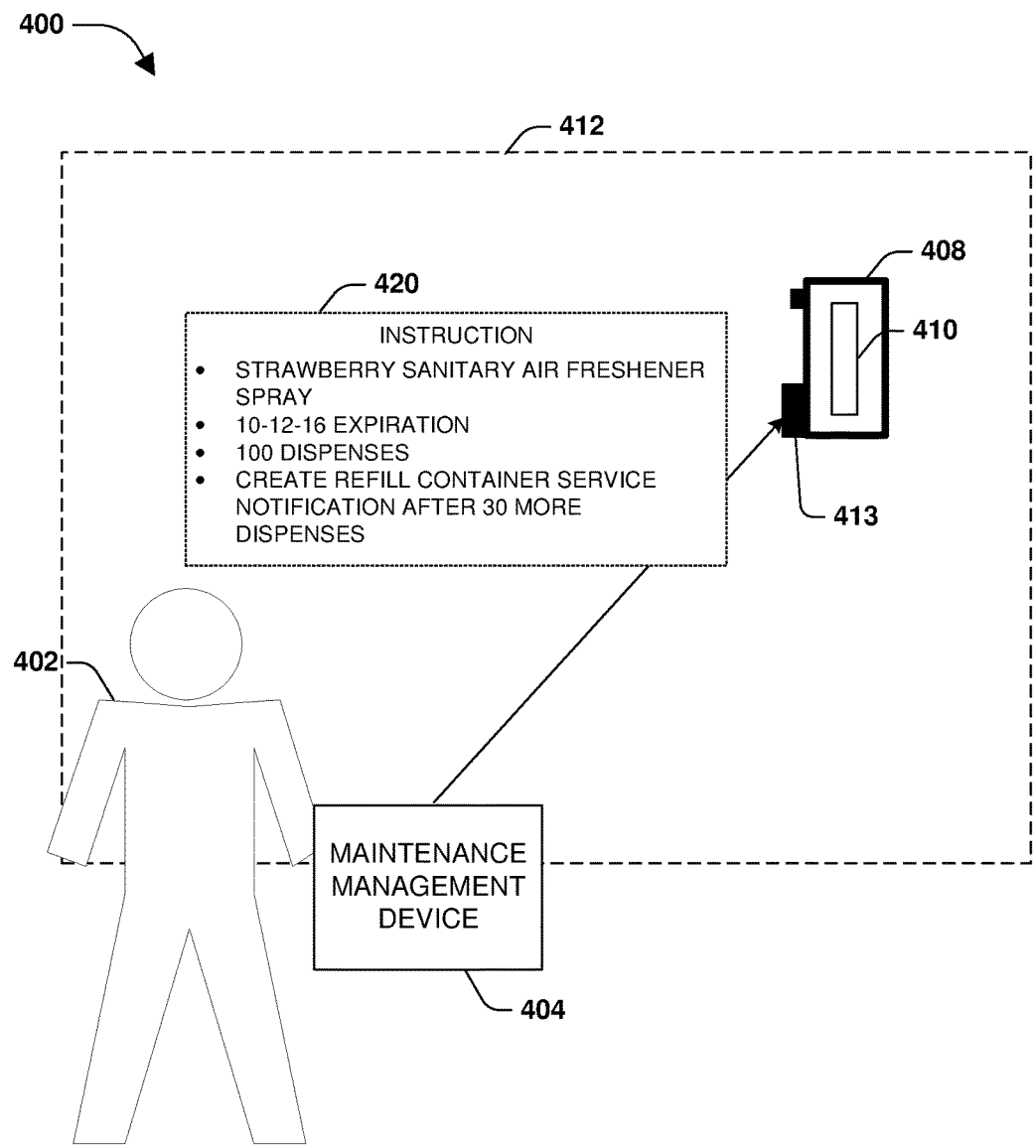
FIG. 4C is a component block diagram illustrating an example system for service notification, where a maintenance management device provides an instruction to a notification device.

FIGS. 4A-4C illustrate examples of a system 400 for service notification. FIG. 4A illustrates the system 400 comprising a notification component 413 and/or a maintenance management device 404. The notification component 413 may be associated with an air freshener 408 configured to dispense air freshener material of an air freshener refill container 410. The maintenance management device 404 may be integrated into a device, such as a wearable device, a computing device, or a mobile device associated with a housekeeper 402. The maintenance management device 404 may be configured to emit service notification requests 406. Because the maintenance management device 404 is not within a communication threshold distance 412 of the air freshener 408, the notification component 413 may be in the dormant low powered state (e.g., a lower powered state than when the air freshener 408 and/or the notification component 413 are operational).

FIG. 4B illustrates the maintenance management device 404 coming within the communication threshold distance 412 of the air freshener 408. Accordingly, the notification component 413 may receive the service notification request 406 from the maintenance management device 404 (e.g., the notification component 313 may transition into an operational state). The notification component 413 may evaluate a current operational status of the air freshener 408 to determine a service notification 420. For example, the service notification 420 may comprise an identifier of the air freshener refill container 410. The notification component 413 may send the service notification 420 to the maintenance management device 404.

FIG. 4C illustrates the maintenance management device 404 providing an instruction 420 to the notification component 413 based upon the identifier of the air freshener refill container 410 (e.g., the maintenance management device 404 may query a data structure, such as one or more database tables or a lookup file, that correlates refill container identifiers with refill container information). For example, the maintenance management device 404 may specify in the instruction 420 that the air freshener refill container 410 is a strawberry sanitary air freshener spray, expires on Oct. 12, 2016, has 100 total dispenses, and that a refill container service notification is to be created by the notification component 413 after 30 more dispenses.

Figure 5:
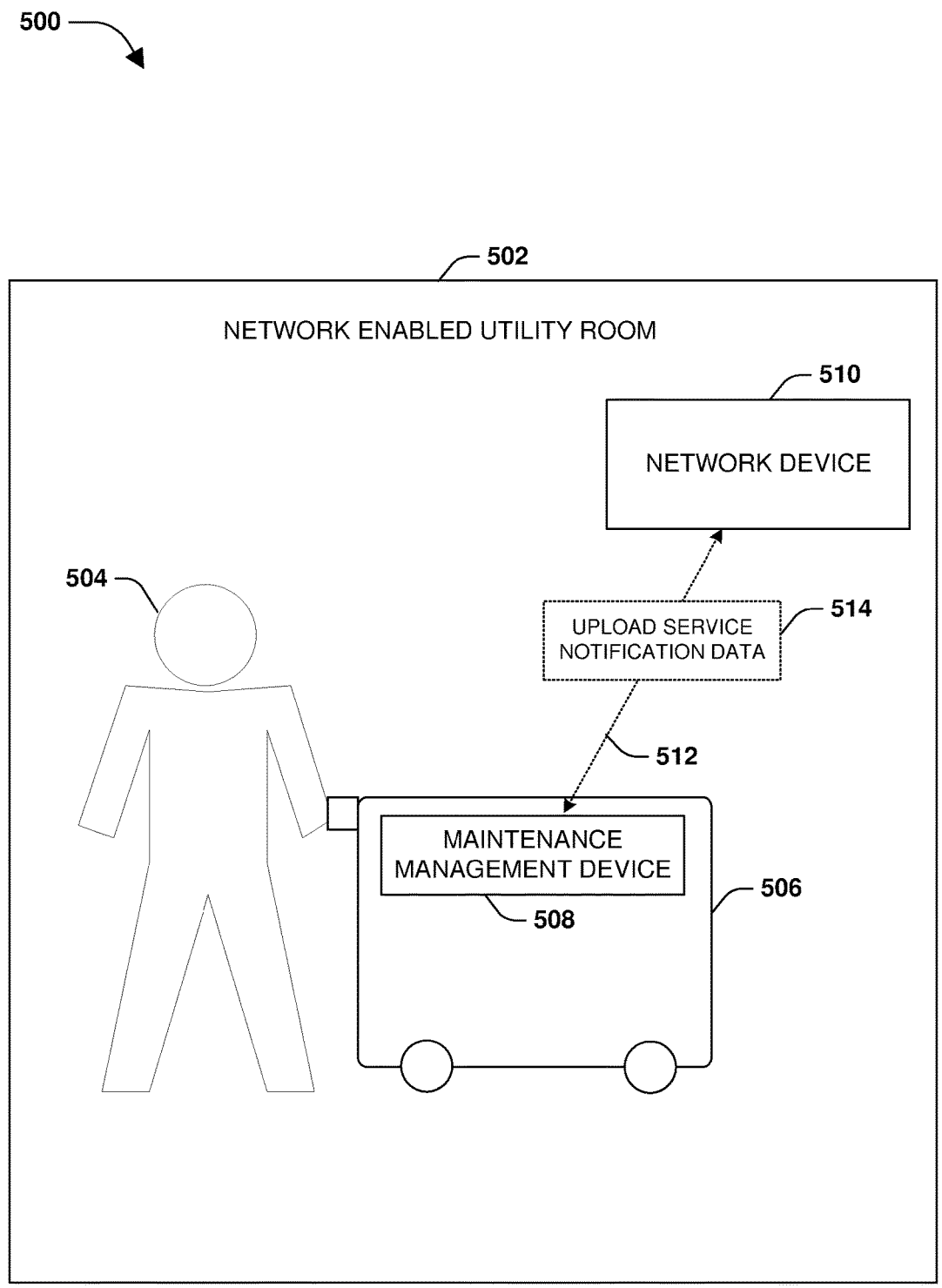
FIG. 5 is a component block diagram illustrating an example system for service notification, where a maintenance management device uploads service notification data over a network.

FIG. 5 illustrates an example of a system 500 for service notification. The system 500 comprises a maintenance management device 508. In an example, the maintenance management device 508 may be integrated into a maintenance cart 506 of a housekeeper 504. The maintenance management device 508 may have collected and stored (e.g., within memory of the maintenance management device 508) service notifications from hygiene devices as service notification data. The housekeeper 504 may return the maintenance cart 506 to a network enabled utility room 502 comprising network device 510 (e.g., a wireless router). The maintenance management device 508 may establish a communication connection 512 with the network device 510. The maintenance management device 508 may be able to communicate over a network utilizing the communication connection 512. For example, the maintenance management device 508 may upload 514 the service notification data over the network to a computing device, such as a maintenance server.

Figure 6:
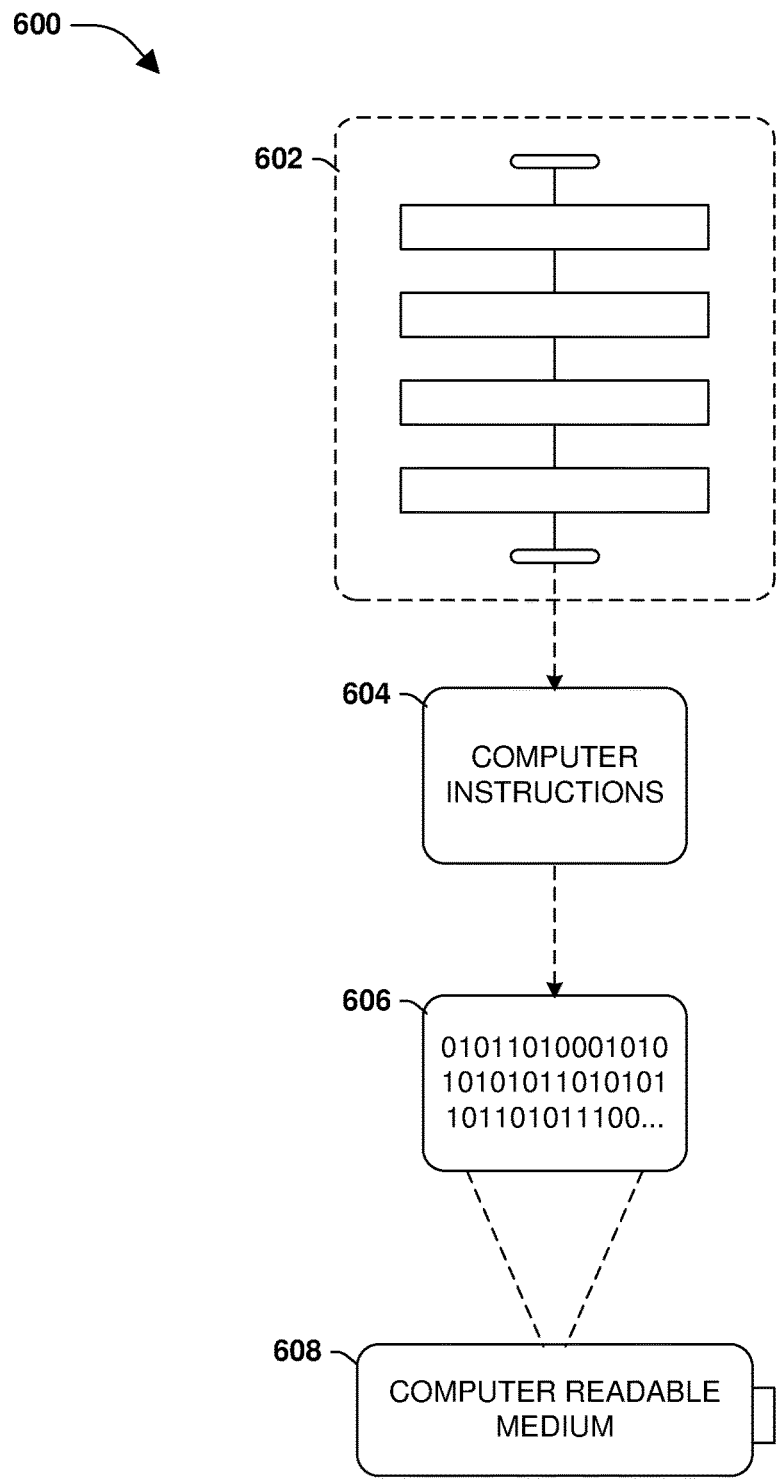
FIG. 6 is an illustration of an example computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 100 of FIG. 1, for example. In some embodiments, the processor-executable instructions 604 are configured to implement a system, such as at least some of the exemplary system 200 of FIGS. 2A-2B, at least some of the exemplary system 300 of FIGS. 3A-3C, at least some of the exemplary system 400 of FIGS. 4A-4C, and/or at least some of the exemplary system 500 of FIG. 5, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
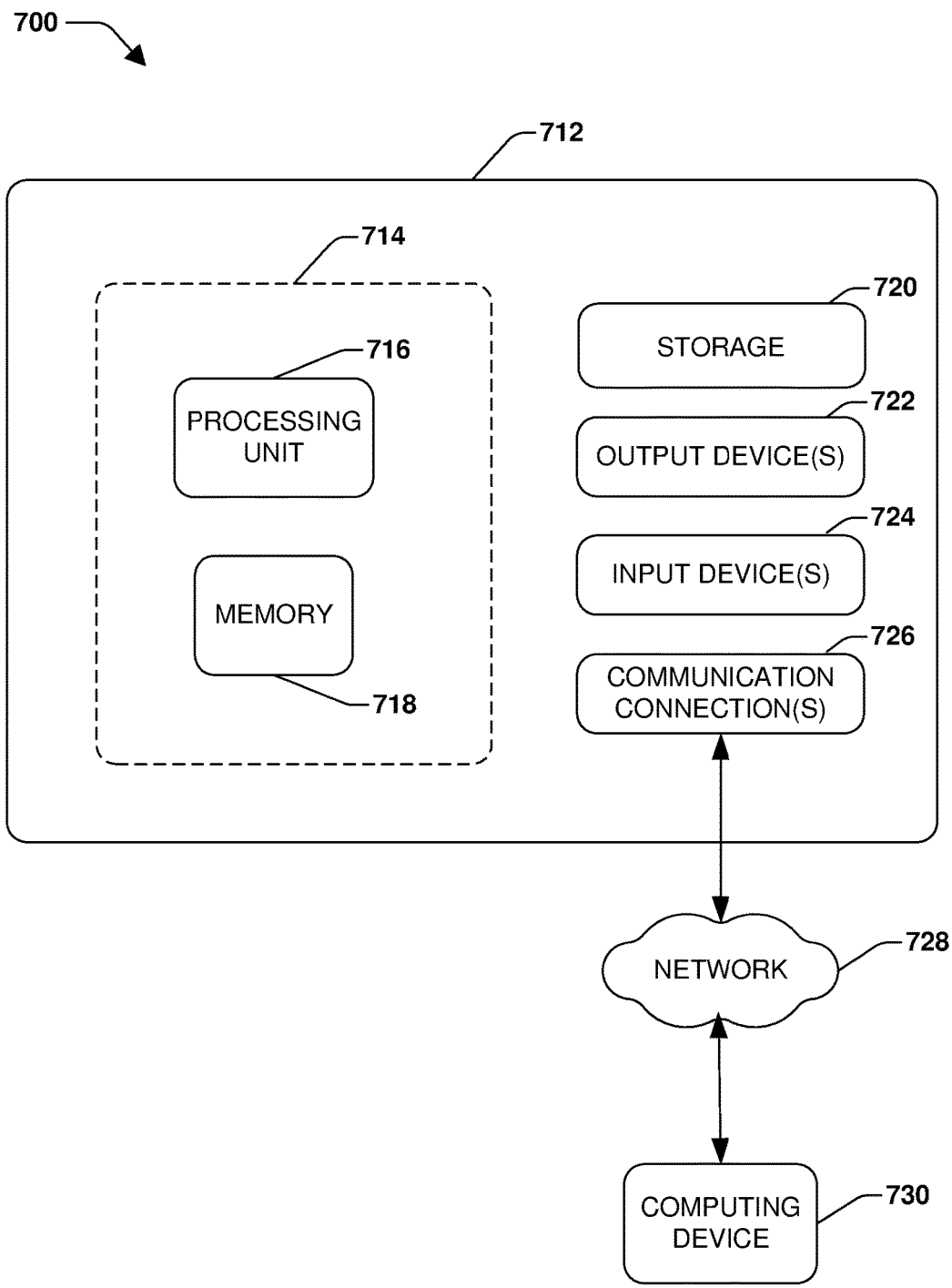
FIG. 7 illustrates an example computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for service notification, comprising:
a notification component, associated with a hygiene device, configured to:
receive a signal, of a service notification request, emitted from a maintenance management device, wherein the signal is received based upon the maintenance management device being within a communication threshold distance of the hygiene device;
responsive to the signal indicating that the maintenance management device is within the communication threshold distance of the hygiene device, transition the notification component into a first power state;
evaluate a current operational status of the hygiene device to generate a service notification;
provide the service notification responsive to the service notification request; and
responsive to determining that the maintenance management device is not within the communication threshold distance of the hygiene device based upon not receiving the signal, transition the notification component into a second power state having a lower power consumption than the first power state.

2. The system of claim 1, the providing the service notification comprising issuing an alert based upon the service notification, the alert comprising at least one of a visual alert, a textual instruction, or an audible alert provided through at least one of a light, a speaker, or a display of the hygiene device.

3. The system of claim 1, the providing the service notification comprising communicating the service notification to the maintenance management device.

4. The system of claim 1, the service notification comprising at least one of a battery status, usage statistics, or a supply status of the hygiene device.

5. The system of claim 1, the hygiene device comprising at least one of a material dispenser, a paper towel dispenser, a bathroom device, a flush valve, an air freshener, a bathroom monitor, a supply container, or a medicine cabinet.

6. The system of claim 1, the notification component configured to:
receive the signal as a powered beacon that energizes the notification component into the first power state.

7. The system of claim 6, the notification component configured to:
utilize the powered beacon to energize a passive radio frequency identification device (RFID) component of the notification component.

8. The system of claim 1, the notification component comprising:
a passive radio frequency identification device (RFID) component for communicating with the maintenance management device.

9. The system of claim 1, the notification component configured to:
provide an identifier of a refill container to the maintenance management device; and
receive an instruction regarding the refill container from the maintenance management device responsive to providing the identifier.

10. The system of claim 9, the instruction specifying a trigger for the notification component to create a refill container service notification, the trigger corresponding to a threshold number of material dispense events.

11. The system of claim 9, the instruction specifying at least one of a refill container type, a refill container expiration date, or a total number of material dispense events permitted for the refill container.

12. A non-transitory computer readable medium having stored thereon instructions, which when executed by a processor, causes the processor to:
 receive a signal, of a service notification request, emitted from a maintenance management device, wherein the signal is received based upon the maintenance management device being within a communication threshold distance of a hygiene device;
 responsive to the signal indicating that the maintenance management device is within the communication threshold distance of the hygiene device, transition into a first power state;
 evaluate a current operational status of the hygiene device to generate a service notification;
 provide the service notification responsive to the service notification request; and
 responsive to determining that the maintenance management device is not within the communication threshold distance of the hygiene device based upon not receiving the signal, transition into a second power state having a lower power consumption than the first power state.

13. The non-transitory computer readable medium of claim 12, the service notification comprising a battery status.

14. The non-transitory computer readable medium of claim 12, the service notification comprising a usage statistic.

15. The non-transitory computer readable medium of claim 12, the service notification comprising a supply status.

16. The non-transitory computer readable medium of claim 12, wherein the instructions cause the processor to:
 receive the signal as a powered beacon that energizes a notification component into the first power state for evaluating the current operational status of the hygiene device.

17. The non-transitory computer readable medium of claim 12, wherein the instructions cause the processor to:
 provide an identifier of a refill container to the maintenance management device; and
 receive an instruction regarding the refill container from the maintenance management device responsive to providing the identifier.

18. A method for service notification, comprising:
 receiving a signal, of a service notification request, emitted from a maintenance management device, wherein the signal is received based upon the maintenance management device being within a communication threshold distance of a hygiene device;
 responsive to the signal indicating that the maintenance management device is within the communication threshold distance of the hygiene device, transitioning into a first power state;
 evaluating a current operational status of the hygiene device to generate a service notification;
 providing the service notification responsive to the service notification request; and
 responsive to determining that the maintenance management device is not within the communication threshold distance of the hygiene device based upon not receiving the signal, transitioning into a second power state having a lower power consumption than the first power state.

19. The method of claim 18, comprising:
 providing an identifier of a refill container to the maintenance management device; and
 receiving an instruction regarding the refill container from the maintenance management device responsive to providing the identifier.

20. The method of claim 18, comprising:
 receiving a firmware update from the maintenance management device; and
 implementing the firmware update upon the hygiene device.

* * * * *